(12) United States Patent
Sasso et al.

(10) Patent No.: US 8,085,687 B2
(45) Date of Patent: Dec. 27, 2011

(54) RETURNING DOMAIN IDENTIFICATIONS WITHOUT RECONFIGURATION

(75) Inventors: Christian Sasso, Milpitas, CA (US); Siddharth Kasat, Santa Clara, CA (US); Ronak Desai, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 12/039,455

(22) Filed: Feb. 28, 2008

(65) Prior Publication Data

US 2009/0219928 A1     Sep. 3, 2009

(51) Int. Cl.
*H04L 12/28* (2006.01)
*H04L 12/56* (2006.01)

(52) U.S. Cl. ......... 370/254; 370/255; 370/389; 370/399

(58) Field of Classification Search .................. 370/254, 370/255, 389, 399
See application file for complete search history.

(56) References Cited

U.S. PATENT DOCUMENTS

| | | | | |
|---|---|---|---|---|
| 6,014,715 | A | * | 1/2000 | Stoevhase ........................ 710/11 |
| 7,230,929 | B2 | * | 6/2007 | Betker et al. .................. 370/254 |
| 7,499,410 | B2 | * | 3/2009 | Dutt et al. ..................... 370/254 |
| 7,565,698 | B2 | * | 7/2009 | Isozaki et al. .................. 726/26 |
| 2002/0133552 | A1 | * | 9/2002 | Ooi et al. ....................... 709/205 |
| 2004/0010624 | A1 | * | 1/2004 | Garofalo et al. ............... 709/250 |
| 2006/0034167 | A1 | * | 2/2006 | Grice et al. ..................... 370/229 |
| 2006/0047907 | A1 | * | 3/2006 | Shiga et al. .................... 711/114 |
| 2007/0058620 | A1 | * | 3/2007 | Willeke et al. ................. 370/386 |
| 2007/0223681 | A1 | * | 9/2007 | Walden et al. ............ 379/221.09 |
| 2008/0010605 | A1 | * | 1/2008 | Frank ............................. 715/765 |
| 2008/0028450 | A1 | * | 1/2008 | Zhao et al. ......................... 726/6 |

* cited by examiner

*Primary Examiner* — Marsha D Banks Harold
*Assistant Examiner* — Saad Hassan
(74) *Attorney, Agent, or Firm* — Patterson & Sheridan, LLP

(57) ABSTRACT

In one embodiment, a technique for returning Domain IDs to a Fibre Channel fabric without a full build fabric (BF) phase is provided. A switch in the fabric may send a principal switch a message requesting the return of one or more Domain IDs assigned to that device. The principal switch may update the list of fabric Domain IDs to remove the Domain IDs identified in the message and send the updated list to devices in the fabric.

11 Claims, 5 Drawing Sheets

RETURNING DOMAIN IDENTIFICATIONS WITHOUT RECONFIGURATION

BACKGROUND OF THE INVENTION

1. Field of the Invention

Embodiments of the present disclosure generally relate to networks and, more particularly, to Fibre Channel network fabrics.

2. Description of the Related Art

The Fibre Channel standard addresses the general need in networking for very fast transfers of large amounts of information. Fibre Channel networks utilize an arrangement of switches, called a Fabric, to connect devices. This approach simplifies the overhead associated with network traffic, as a device with a Fibre Channel port need only manage a point-to-point connection between its port and the Fabric.

To eliminate ambiguity when routing traffic between switches in a fabric, each switch in a Fabric is assigned one or more unique Domain_IDs during a multi-phase process. In a first phase, one switch in the fabric is selected as a Principal Switch. The Principal Switch then assigns Domain_IDs to the other switches of the Fabric in a second phase. For some applications, such as virtual storage area network (VSAN) applications, a single switch may have multiple assigned Domain_IDs, including virtual Domain_IDs.

In some cases, it may be desirable for a switch to return a Domain_ID. For example, there may be a limited number of Domain_IDs available and returning a Domain_ID may allow that Domain_ID to be re-assigned to a different device, thereby preserving Domain_IDs while still maintaining uniqueness. Another situation where it can be useful to release a Domain_ID is when all the devices associated with it have been freed. Unfortunately, in conventional systems, re-assigning Domain_IDs typically requires a lengthy reconfiguration process that involves flooding the network with frames that may disrupt device operation.

Accordingly, what is needed is an improved technique for returning Domain_IDs.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure may reduce the time required for returning domain IDs assigned to devices in a Fibre Channel fabric in comparison to conventional networks that would require a reconfiguration process. By supporting messages that allow subordinate switches to request the return of domain IDs assigned to them, previously assigned domain IDs may be returned (for later reassignment while maintaining uniqueness) without a lengthy fabric rebuild. In addition to saving time, avoiding a fabric rebuild may prevent the associated flooding of frames through the network which may contribute to excessive device loading and a resulting unrecoverable state.

One environment that provides a useful application of the techniques presented herein is a virtual storage area network (VSAN) where the domain ID list includes virtual domain IDs. The techniques presented herein provide a great deal of flexibility in administering a VSAN by allowing virtual domain IDs to be removed from the fabric domain ID list without the necessity for a lengthy re-build fabric phase.

As used herein, the term fabric generally refers to an arrangement of one or more interconnected switches that connect devices in a network. As used herein, the term Principal Switch generally refers to a switch in a Fibre Channel fabric that assigns Domain_IDs to other switches in the same fabric.

Embodiments of the present disclosure are described below with reference to returning domain IDs in Fibre Channel fabrics. However, those skilled in the art will appreciate that the techniques described herein may also be more generally applied during a variety of different types of events that alter or reconfigure a fabric, such as re-booting a switch, reconfiguring a switch or any type of event in which domain IDs may be recovered and/or reassigned.

An Exemplary Network Environment

Figure 1:
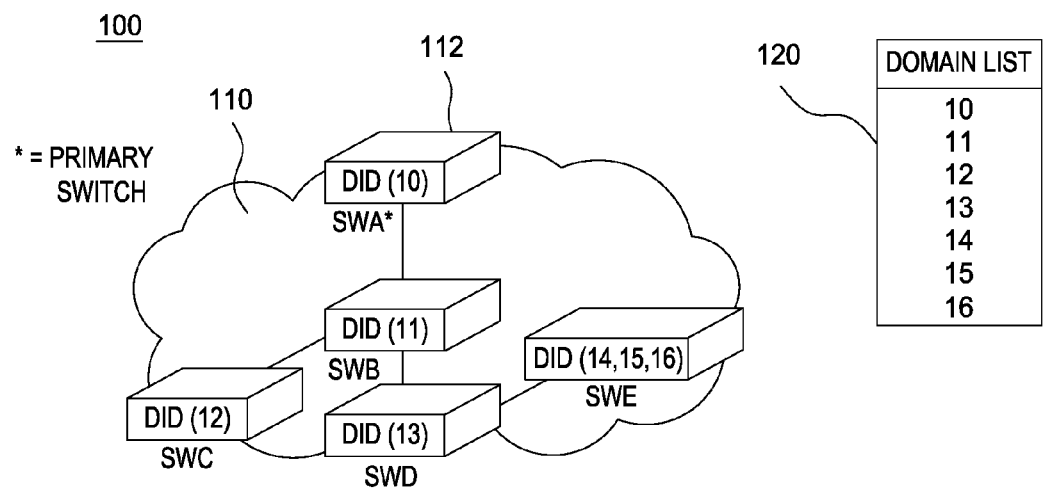
FIG. 1 illustrates an example of a Fibre Channel network in which embodiments of the present disclosure may be practiced.

FIG. 1 illustrates one example of a network environment 100, in which embodiments of the present disclosure may be utilized. As illustrated, the network 100 includes a fabric 110. While the fabric may be formed by a relatively large number of different types of network elements, to simplify the illustrated example, each fabric is shown with a relatively small number of switches 112.

The example fabric 110 has five switches, Switch A, Switch B, Switch C, Switch D, and Switch E, with unique Domain_IDs 10, 11, 12, 13, and 14-16 respectively. Switch A is designated as the Principal Switch for the fabric and Switches B-E are subordinate switches. Each switch may keep a local copy of a fabric Domain_ID list 120, typically broadcast by the principal switch after having assigned a domain.

As previously described, it may be desirable to allow subordinate switches to return Domain_IDs, for example, to free up those Domain_IDs to be reassigned to other switches. According to embodiments of the present disclosure, Domain_IDs may be returned without a lengthy reconfiguration process involving a (re)build fabric (BF) phase. For some embodiments, a subordinate switch may be able to request the removal of Domain_IDs assigned to that switch via a message sent to the primary switch. In response, the primary switch may acknowledge acceptance of the request with a response message and send an updated Domain_ID list to all devices in the fabric.

Any suitable mechanism may be used to request removal of a set of one or more Domain_IDs assigned to a switch. For some embodiments, a special message may be provided for the specific purpose of returning Domain_IDs. For other embodiments, however, an existing message may be utilized to request removal of Domain_IDs.

For example, a Request Domain Identifier (RDI) message commonly used to request specified Domain IDs be assigned to a switch may be manipulated to instead request removal of specified Domain_IDs. Conventional RDI messages may recognize only a limited range of values as valid Domain_IDs in a request. However, a "reverse" RDI message may include a ("trigger") value outside of this range as an indicator that the message is requesting removal of a list of Domain_IDs to follow. For example, assuming valid Domain_IDs in a range from 1-239, a trigger value of "0" or "240" may be used as an indicator. To facilitate understanding, the following description will assume the use of such a reverse RDI (RRDI) as the mechanism to request removal of Domain_IDs.

Figure 2:
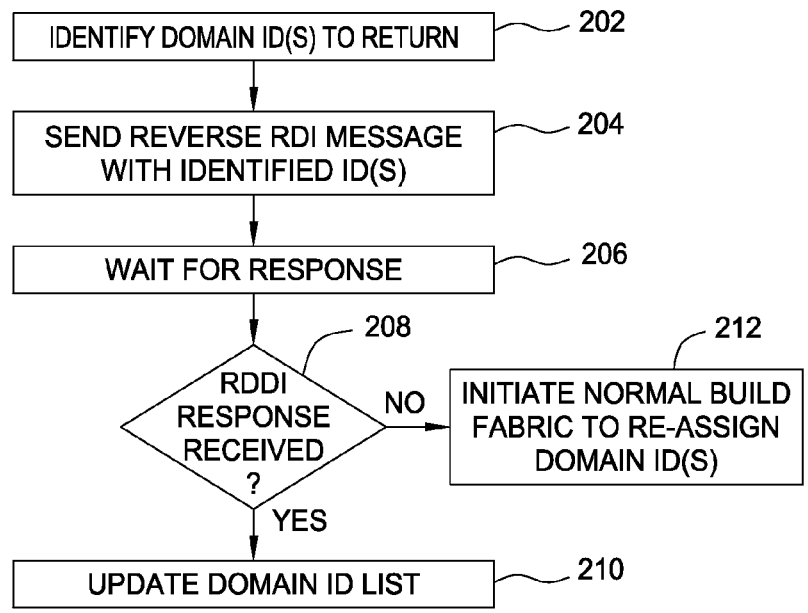
FIG. 2 is a flow diagram of example operations that may be performed by a subordinate switch for returning domain IDs in accordance with embodiments of the present disclosure.

FIG. 2 illustrates example operations 200 that may be performed, for example by a subordinate switch in a fabric, to return Domain_IDs. The operations begin, at 202, by identifying one or more Domain_IDs to return. At 204, the switch sends an RRDI message specifying the Domain_IDs to be returned and waits for an RRDI response from the primary switch, at 206.

If an RRDI response is received, at 208, the requesting switch updates its Domain_ID list to remove the returned Domain_IDs. For some embodiments, the primary switch may not send an explicit RRDI response but, rather, may indicate acceptance of the request by sending a new Domain_ID list to all the switches in the fabric with the specified Domain_IDs removed.

As illustrated, if an RRDI response (or new Domain_ID list) is not received, the switch may initiate a normal Build Fabric (BF) phase, at 212. In other words, the requesting switch may still return Domain_IDs even if the principal switch does not support Domain_ID removal without reconfiguration. Thus, even if the principal switch does not support Domain_ID removal without reconfiguration, a subordinate switch may still operate properly, by regressing to conventional reconfiguration operations.

Figure 3:
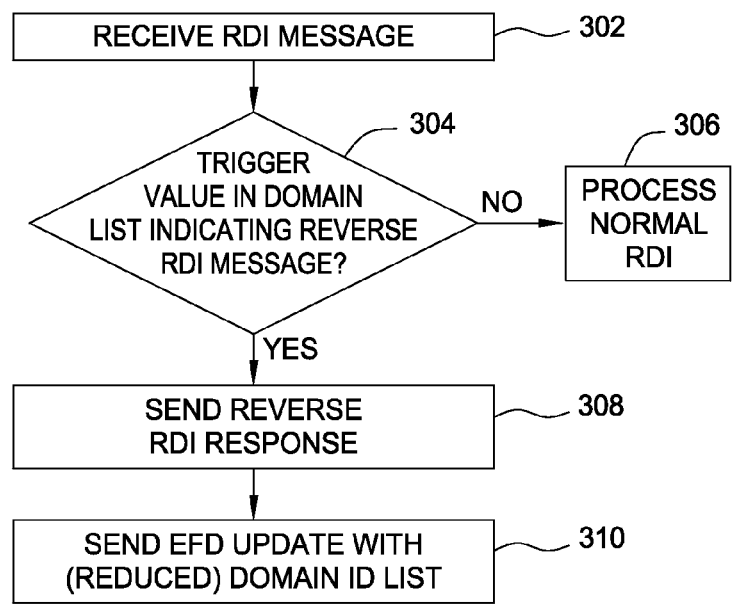
FIG. 3 is a flow diagram of example operations that may be performed by a principal switch for returning domain IDs in accordance with embodiments of the present disclosure.

FIG. 3 illustrates example operations 300 that may be performed by the principal switch to return Domain_IDs (e.g., in response to operations 200 performed by the subordinate switch). The operations 300 may be described with reference to FIGS. 4A-4D which illustrate message flow during Domain_ID return operations according to embodiments of the present invention.

The operations begin, at 302, by receiving an RDI message. If the RDI message does not include a trigger value indicating a "reverse" RDI message, as determined at 304, the principal switch processes the "normal" RDI message, at 306. If the message does include a trigger value indicating an RRDI, however, the principal switch proceeds to process perform operations 308 and 310.

Figure 4A:
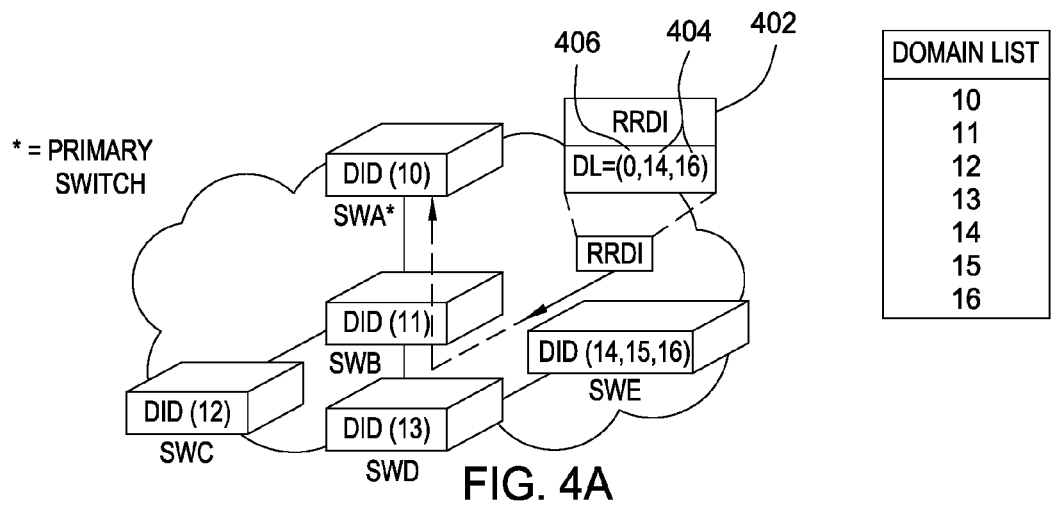
FIGS. 4A-4D illustrate different stages of returning domain IDs in accordance with embodiments of the present disclosure.

As illustrated in FIG. 4A, Switch E may send an RRDI message 402 towards the principal Switch A. The RRDI message may take the form of an RDI message that includes a trigger value 406 indicating a list 404 of one or more Domain_IDs to be removed follows. In this example, a trigger value of "0" indicates Switch E is requesting removal of the Domain IDs 14 and 16 that follow.

Figure 4B:
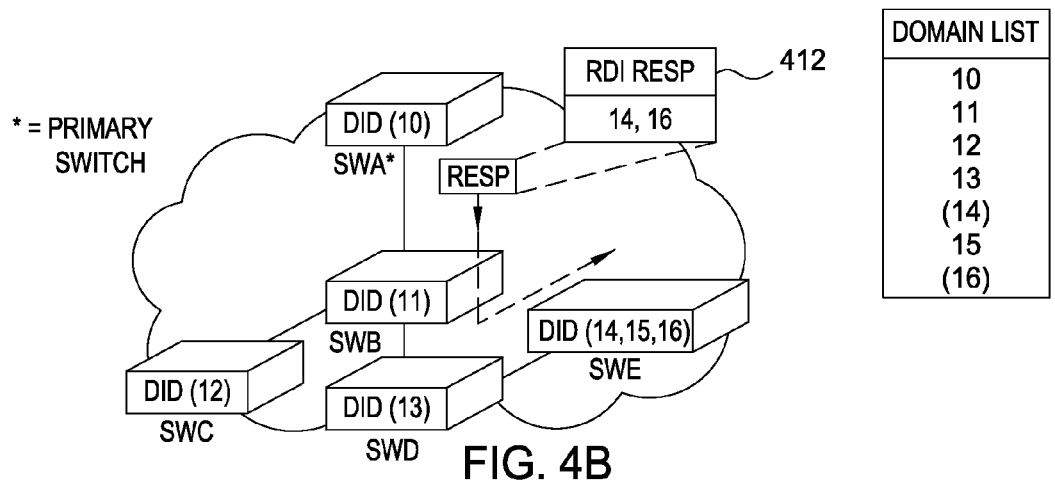

At 308, the principal switch sends an RRDI response to the requesting switch. As illustrated in FIG. 4B, principal switch A may send an RRDI response message 412 that includes the Domain_IDs to be removed. Depending on the implementation, the RRDI response may be the same as a standard RDI response and may or may not also include the trigger value.

Figure 4C:
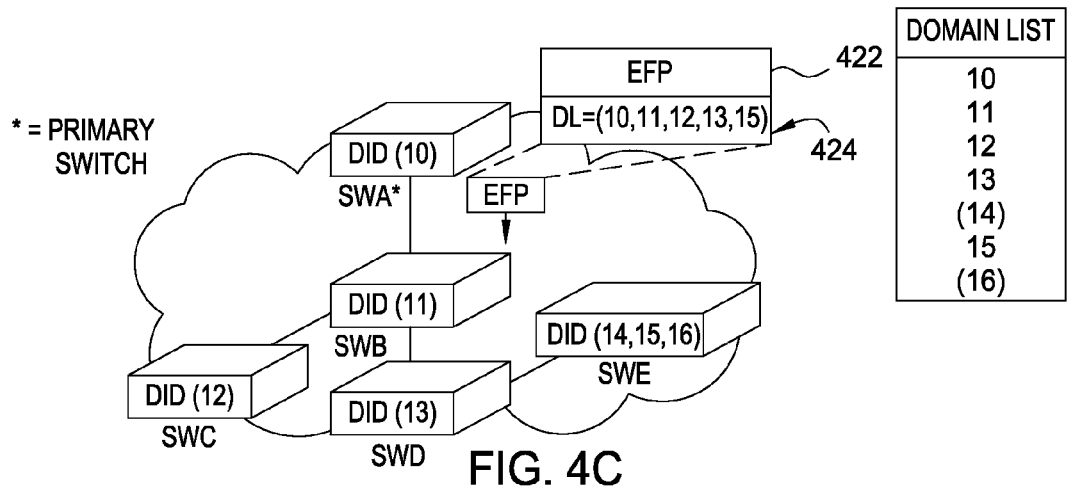
Figure 4D:
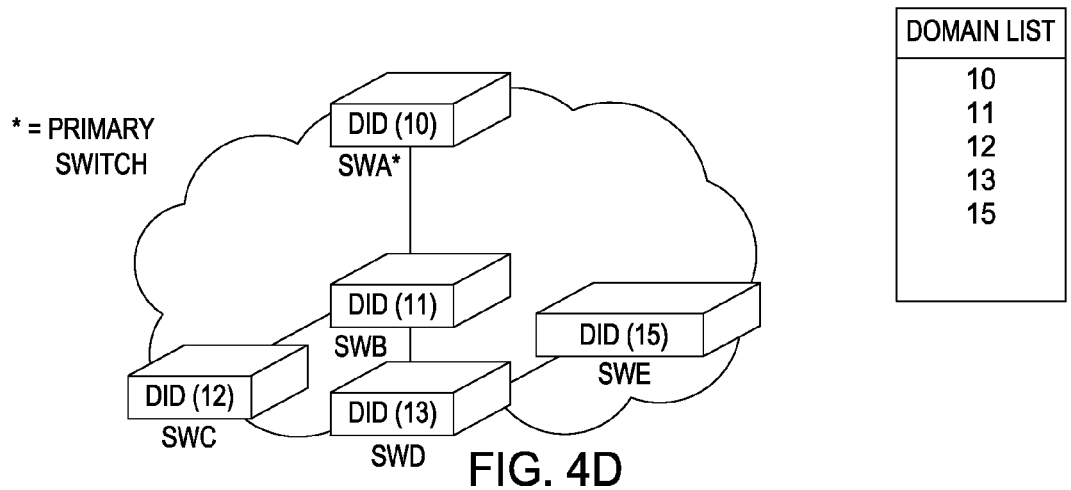

At 310, the principal switch may send an updated Domain_ID list to the other switches in the fabric. As illustrated in FIG. 4C, principal switch A may send an EFP update frame 422 with a reduced list 424 of fabric Domain_IDs to all the switches in the fabric. As illustrated in FIG. 4D, upon receipt of the EFP update frame 422, each switch may extract the new Domain ID list 424 and update their local copy of the fabric Domain ID list 120 accordingly.

Whether a device operates as a principal switch or a subordinate switch may depend on the results of a build fabric (BF) phase. Because a device may operate as either, for some embodiments, a single device may support the return of Domain_IDs when acting as either a principal switch or subordinate switch. In other words, the device may perform operations such as those shown in FIG. 3 when operating as a principal switch and perform operations such as those shown in FIG. 2 when operating as a subordinate switch.

Interoperability

As described above, in the event that a subordinate switch does not receive a response to an RRDI message requesting removal of Domain_IDs, the Domain_IDs may still be returned through a conventional reconfiguration process. This scenario is illustrated in FIGS. 5A-5C.

Figure 5A:
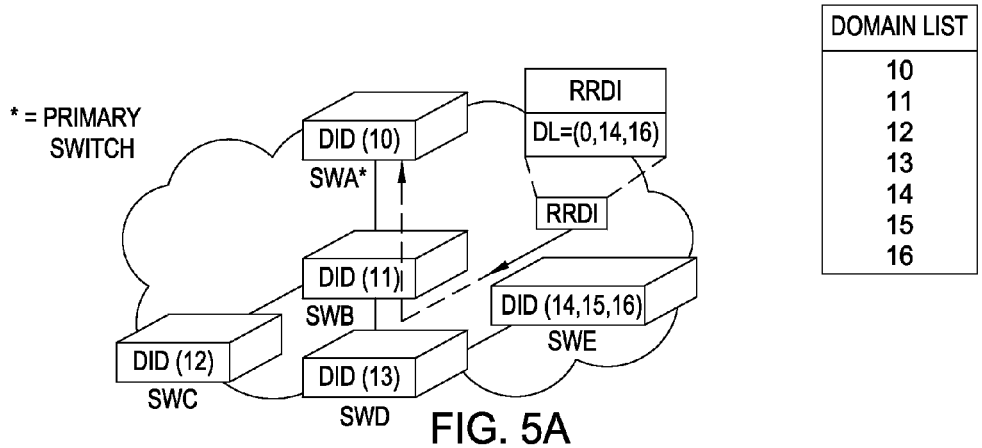
FIGS. 5A-5C illustrate the interoperability of switches that support reverse RDI messages and switches that do not support reverse RDI messages IDs in accordance with embodiments of the present disclosure.
Figure 5B:
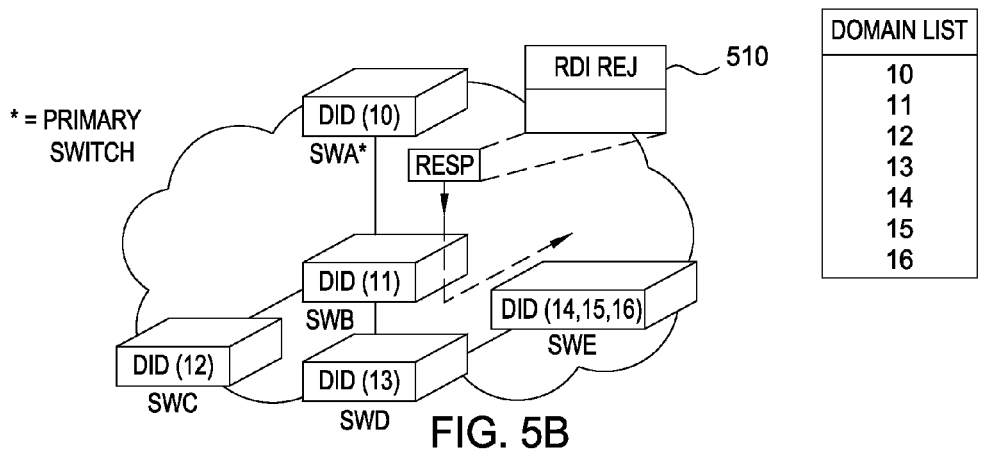
Figure 5C:
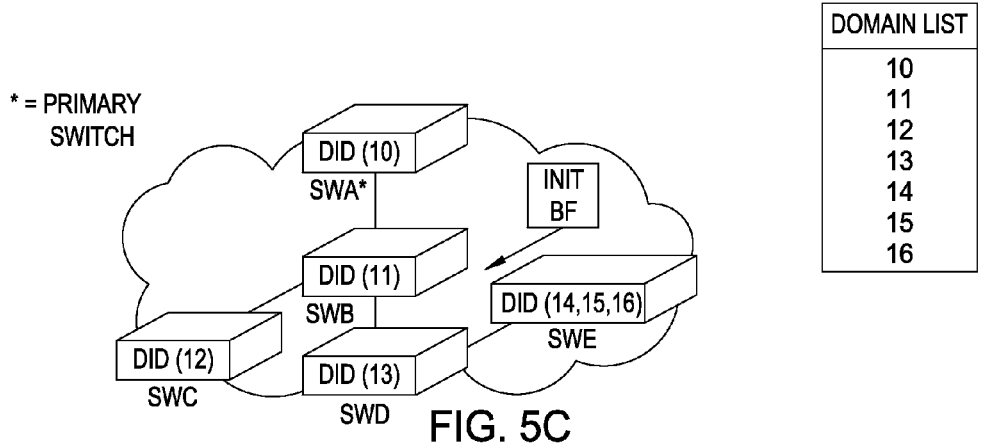

In FIG. 5A, switch E sends an RRDI message requesting removal of Domain_IDs 14 and 16. The example assumes that principal switch A does not support RRDIs. As illustrated in FIG. 5B, principal switch A may simply treat the RRDI message (with an invalid Domain_ID as a trigger value) as a non-well-formatted RDI message frame and return an RDI reject message 510. As illustrated in FIG. 5C, switch E may interpret the RDI reject message 510 as an indication that master switch A does not support RRDI message and that it needs to initiate a standard BF phase.

As the preceding example illustrates, switches that support Domain_ID removal without reconfiguration may be interoperable with switches that do not support Domain_ID removal. This may have a significant effect in the market place, as this results in inter-operability between devices that support this feature and devices that do not. In other words, each device in a network does not need to be replaced if a single device supporting the feature is added.

In the event a principal switch does not support Domain_ID removal, a conventional reconfiguration process may occur. In other words, if a device that supports the feature is added to other devices that do not, the device may continue to operate in a conventional manner, in essence, with the time required to return Domain_IDs regressing to that of a conventional BF phase.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
    determining a set of one or more domain identifiers assigned to a switch in a network fabric when the switch joined the network fabric, wherein each of the set of one or more domain identifiers uniquely identifies the switch relative to other switches in the network fabric;

composing a message to de-assign the set of one or more domain identifiers from the switch in the network fabric, wherein the message is composed according to a predefined format of a request domain identifier (RDI) message configured to request one or more domain identifiers to be assigned to the switch, the predefined format specifying a valid range of domain identifiers, the message specifying the set of one or more domain identifiers, wherein the set of one or more domain identifiers is within the valid range, and wherein the message further specifies a trigger value outside of the valid range, wherein the RDI message is characterized by absence of the trigger value, and wherein presence of the trigger value in the message indicates that the message is a reverse request domain identifier (RRDI) message configured to request the set of one or more domain identifiers to be de-assigned from the switch;

sending the message to a principal switch of the fabric requesting de-assignment of the set of one or more domain identifiers from the switch in the network fabric without a build fabric phase, such as to render the set of one or more domain identifiers available for reassignment to other switches in the network fabric, wherein the build fabric phase comprises reconfiguring one or more switches in the network fabric by flooding the network fabric with build fabric frames;

receiving, from the principal switch, a response to the message;

upon determining, based on the response indicating that the message contains an invalid domain identifier, that the principal switch does not support return of domain identifiers without a build fabric phase, initiating a build fabric phase to effect removal of the domain identifiers; and upon determining, based on at least one of the response acknowledging the message and the response including an updated list of fabric identifiers reflecting removal of the domain identifiers, that the principal switch supports return of domain identifiers without a build fabric phase, updating a local list of fabric identifiers to effect removal of the domain identifiers without any build fabric phrase.

2. The method of claim 1, wherein the network fabric is part of a virtual storage area network (VSAN), and wherein the determined domain identifiers comprise one or more virtual identifiers.

3. The method of claim 1, wherein the fabric comprises a Fibre Channel fabric.

4. A method, comprising:

receiving a message requesting return of a set of one or more domain identifiers assigned to a switch in a Fibre Channel fabric when the switch joined the Fibre Channel fabric, wherein each of the domain identifiers uniquely identifies the switch relative to other switches in the Fibre Channel fabric, wherein the message is composed according to a predefined format of a request domain identifier (RDI) message configured to requesting one or more domain identifiers to be assigned to the switch, the predefined format specifying a valid range of domain identifiers, the message specifying the set of one or more domain identifiers, the set of one or more domain identifiers being within the valid range, wherein the message further specifies a trigger value comprising a domain identifier outside of the valid range, wherein the RDI message is characterized by absence of the trigger value, and wherein presence of the trigger value in the message indicates that the message is a reverse request domain identifier (RRDI) message configured to request the set of one or more domain identifiers to be de-assigned from the switch;

updating a list of fabric identifiers to remove the one or more domain identifiers; and sending a response containing the updated list of fabric identifiers to one or more switches in the Fibre Channel fabric, wherein at least one of the switches is configured to:

receive the response;

upon determining, based on the response indicating that the message contains an invalid domain identifier, that return of domain identifiers without a build fabric phase is not supported, initiate a build fabric phase to effect removal of the domain identifiers, wherein the build fabric phase comprises reconfiguring one or more switches in the Fibre Channel fabric by flooding the Fibre Channel fabric with build fabric frames; and upon determining, based on the response containing the updated list of fabric identifiers, that the return of domain identifiers without a build fabric phase is supported, update a local list of fabric identifiers to effect removal of the domain identifiers without any build fabric phrase.

5. The method of claim 4, further comprising:

sending a response message to a switch that sent the message requesting return of the set of one or more domain identifiers.

6. An apparatus, comprising:

an interface for connecting the apparatus to a Fibre Channel fabric;

logic for sending a message to a principal switch of the Fibre Channel fabric requesting return of a set of domain identifiers as available for reassignment to other switches in the network fabric and without a build fabric phase, wherein the build fabric phase comprises reconfiguring one or more switches in the Fibre Channel fabric by flooding the network fabric with build fabric frames, and wherein the set of domain identifiers is previously assigned to a switch in the Fibre Channel fabric, wherein each of the domain identifiers uniquely identifies the switch relative to other switches in the Fibre Channel fabric, wherein the message is composed according to a predefined format of a request domain identifier (RDI) message configured to request one or more domain identifiers to be assigned, the predefined format specifying a valid range of domain identifiers, the message specifying the set of domain identifiers, the set of domain identifiers being within the valid range, wherein the message further specifies a trigger value comprising a domain identifier outside of the valid range, wherein the RDI message is characterized by absence of the trigger value, and wherein presence of the trigger value in the message indicates that the message is a reverse request domain identifier (RRDI) message configured the set of domain identifiers to be de-assigned from the switch;

logic for receiving, from the principal switch, a response to the message;

logic for, upon determining, based on the response indicating that the message contains an invalid domain identifier, that the principal switch does not support return of domain identifiers without a build fabric phase, initiating a build fabric phase to effect removal of the domain identifiers; and logic for, upon determining, based on at least one of the response acknowledging the message and the response including an updated list of fabric identifiers reflecting removal of the domain identifiers, that the principal switch supports return of domain identifiers without a build fabric phase, updating a local list of fabric identifiers to effect removal of the domain identifiers without any build fabric phrase.

7. The apparatus of claim 6, wherein:

the fabric is part of a virtual storage area network (VSAN); and the determined domain identifiers comprise one or more virtual identifiers.

8. The apparatus of claim 6, wherein:

the apparatus is capable of acting as a principal switch in the fabric; and the apparatus further comprises logic for, when the apparatus is acting as a principal switch, receiving a message requesting return of one or more domain identifiers assigned to a switch in the fabric, updating a list of fabric identifiers to remove the one or more domain identifiers, and sending the updated list of fabric identifiers to one or more switches in the fabric.

9. The apparatus of claim 8, further comprising:

logic for, when the apparatus is acting as a principal switch, sending a response message to a switch that sent the message requesting return of the one or more domain identifiers.

10. An apparatus, comprising:

an interface for connecting the apparatus to a network fabric;

means for sending a message to a principal switch of the fabric requesting return of a set of domain identifiers as available for reassignment to other switches in the network fabric and without a build fabric phase, wherein the build fabric phase comprises reconfiguring one or more switches in the network fabric by flooding the network fabric with build fabric frames, and wherein the set of domain identifiers is previously assigned to a switch in the network fabric, wherein each of the domain identifiers uniquely identifies the switch relative to other switches in the network fabric, wherein the message is composed according to a predefined format of a request domain identifier (RDI) message configured to request one or more domain identifiers to be assigned to the switch, the predefined format specifying a valid range of domain identifiers, the message specifying the set of domain identifiers, the set of domain identifiers being within the valid range, wherein the message further specifies a trigger value outside of the valid range, wherein the RDI message is characterized by absence of the trigger value, and wherein presence of the trigger value in the message indicates that the message is a reverse request domain identifier (RRDI) message configured to request the set of domain identifiers to be de-assigned from the switch;

means for receiving, from the principal switch, a response to the message;

means for, upon determining, based on the response indicating that the message contains an invalid domain identifier, that the principal switch does not support return of domain identifiers without a build fabric phase, initiating a build fabric phase to effect removal of the domain identifiers; and means for, upon determining, based on at least one of the response acknowledging the message and the response including an updated list of fabric identifiers reflecting removal of the domain identifiers, that the principal switch supports return of domain identifiers without a build fabric phase, updating a local list of fabric identifiers to effect removal of the domain identifiers without any build fabric phrase.

11. The apparatus of claim 10, further comprising:

means for, when the apparatus is acting as a principal switch in the fabric, receiving a message requesting return of one or more domain identifiers assigned to a switch in the fabric, updating a list of fabric identifiers to remove the one or more domain identifiers, and sending the updated list of fabric identifiers to one or more switches in the fabric.

* * * * *

UNITED STATES PATENT AND TRADEMARK OFFICE
CERTIFICATE OF CORRECTION

| | | |
|---|---|---|
| PATENT NO. | : 8,085,687 B2 | |
| APPLICATION NO. | : 12/039455 | |
| DATED | : December 27, 2011 | |
| INVENTOR(S) | : Sasso et al. | |

It is certified that error appears in the above-identified patent and that said Letters Patent is hereby corrected as shown below:

In the Claims:

Column 5, Claim 4, Lines 58-59, please delete "requesting" and insert --request-- therefor.

Signed and Sealed this
Twentieth Day of March, 2012

David J. Kappos
*Director of the United States Patent and Trademark Office*